(12) United States Patent
Safa-Bakhsh et al.

(10) Patent No.: US 8,843,347 B2
(45) Date of Patent: Sep. 23, 2014

(54) METHOD, MONITORING SYSTEM AND COMPUTER PROGRAM PRODUCT FOR MONITORING THE HEALTH OF A MONITORED SYSTEM UTILIZING AN ASSOCIATIVE MEMORY

(75) Inventors: Robab Safa-Bakhsh, Ambler, PA (US); Patrick Neal Harris, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 13/175,390

(22) Filed: Jul. 1, 2011

(65) Prior Publication Data

US 2013/0073259 A1    Mar. 21, 2013

(51) Int. Cl.
*G06F 17/15* (2006.01)
*G05B 23/02* (2006.01)
*G06F 17/30* (2006.01)

(52) U.S. Cl.
CPC ............ *G05B 23/02* (2013.01); *G05B 23/0229* (2013.01); *G06F 17/30539* (2013.01)
USPC ....................................................... 702/183

(58) Field of Classification Search
CPC ................ G05B 2/02293; G05B 23/02; G06F 17/30539
USPC ....................................................... 702/183
See application file for complete search history.

(56) References Cited

U.S. PATENT DOCUMENTS

| | | | |
|---|---|---|---|
| 8,494,811 B2 * | 7/2013 | Fujiwara et al. | 702/184 |
| 2004/0073404 A1 | 4/2004 | Brooks et al. | |
| 2010/0205192 A1 | 8/2010 | Quadracci et al. | |
| 2010/0205212 A1 | 8/2010 | Quadracci et al. | |

FOREIGN PATENT DOCUMENTS

JP    2006349393 A  * 12/2006

OTHER PUBLICATIONS

Definition of "correlate", thefreedictionary.com, http://www.thefreedictionary.com/p/correlate, last accessed (Aug. 13, 2013).*
About Associative Memory—Data Analytics | Saffron Technology, Inc. [online] [retrieved Jan. 23, 2013]. Retrieved from, the internet: <URL: http://saffrontech.com/2011/07/22/about-associative-memory/>. Dated Jul. 22, 2011, 7 pages.
European Search Report for Application No. EP 12 17 4506, dated Oct. 11, 2013.

* cited by examiner

*Primary Examiner* — John Breene
*Assistant Examiner* — Timothy H Hwang
(74) *Attorney, Agent, or Firm* — Alston & Bird LLP (57) ABSTRACT

A monitoring system, method and computer program product are provided for monitoring the health of a monitored system. The monitoring system may include a receiver module to receive a plurality of sensor data relating to the monitored system and to receive textual data, such as free text, relating to the monitored system. The monitoring system may also include an associative memory to store and process the sensor data and the textual data and to establish associations between at least some of the sensor data and the textual data. Further, the monitoring system may include a dynamic change identification module to identify an instance in which the sensor data represents a dynamic change in condition and a correlation module to identify an instance in which textual data is associated with the sensor data proximate the dynamic change in condition so as to correlate the sensor data and the textual data.

17 Claims, 6 Drawing Sheets

METHOD, MONITORING SYSTEM AND COMPUTER PROGRAM PRODUCT FOR MONITORING THE HEALTH OF A MONITORED SYSTEM UTILIZING AN ASSOCIATIVE MEMORY

TECHNOLOGICAL FIELD

Embodiments of the present disclosure relate generally to techniques for monitoring the health of a monitored system and, more particularly, to methods, monitoring systems and computer program products for monitoring the health of a monitored system utilizing an associative memory.

BACKGROUND

A wide variety of systems, such as platforms, e.g., vehicles, wind turbines, engines and the like, are monitored in order to assess the health of the system and its constituent subsystems. In the context of a platform, for example, health monitoring may categorize the platform in one of a number of predefined states, such as new, operational, degraded, needs repair, repaired, etc. The health monitoring may be performed for a variety of reasons including diagnostic purposes in which the information that is collected is utilized to diagnose problems so as to expedite the repair of the platform. Additionally, health monitoring may be performed for prognostic purposes in order to identify potential problems before the problems have matured and caused a fault or other significant issue so as to allow the platform to be maintained in the manner that prevents the onset of problems and/or that allows for an orderly scheduling of maintenance activities.

While monitoring the health of a platform, a variety of data may be collected regarding a platform and its operation. In this regard, sensor data from a variety of different types of sensors may be collected and assessed. Additionally, textural data may be provided regarding the platform, such as by maintenance engineers in conjunction with maintenance activities. This textural data may be provided in a variety of different manners including configuration management reports, engineering analysis reports, environmental conditions, previous health assessments, life cycle management directives, maintenance action reports, mission reports, part numbers, part names, and parts functional descriptions, service bulletins, specifications and requirements, software functional mapping and/or supplier data.

The health of a platform may be analyzed by various techniques including statistical analysis, sensor signal processing and rules-based systems. The statistical analysis of the data collected during health monitoring of a platform may reduce and transform the data samples into a relatively small set of statistical parameters that conceptually characterize the platform. Statistical assumptions are based on large numbers of samples that are not often available. By definition, statistical-based techniques reduce the amount of information that is considered during an analysis of the health of a platform to a more manageable set of parameters that are believed to sufficiently characterize the platform. However, pure statistical solutions, such as analysis of variance (ANOVA), have limitations in regards to the number of variables that may be examined prior to reaching the computational limits. Additionally, statistical solutions may be unable to correlate numerical data with the textural data such that a statistical solution will generally deem the textural data to be irrelevant and will not consider the textural data during the statistical analysis of the health of the platform.

In regards to systems that are based on sensor signal processing, features from a single sensor, such as a vibration sensor, may be extracted and then compared to a predefined threshold in order to identify a fault or other issue with the platform. However, the signals provided by a sensor in response to the same conditions may vary from one platform to another which, along with the propagation of a fault indication from one system to another, may render a sensor signal processing technique somewhat less reliable in some situations. As such, sensor signal processing systems may not be directly utilized to generate maintenance actions. Instead, sensor signal processing systems may be combined with the outputs of other types of sensors, such as an oil debris monitoring sensor, to enhance the rate at which faults or other issues are detected. Although the performance of a sensor signal processing system may be enhanced by its coupling to the output of other types of sensors, sensor signaling processing systems may still be sensitive to operational load and vibration characteristics, which may cause the performance of such sensor signal processing systems to undesirably vary.

Further, a rules-based system includes rules that generally encode the knowledge of a subject matter expert into a software-based system. As such, at least one subject matter expert must exist for the particular domain and, if multiple experts exist, the experts must agree on the rule set and must follow the same rules. The experts upon which such a rule-based system is based must also generally agree to reveal the domain taxonomy and to reveal explanations about the taxonomy and must be willing to constantly adapt the rules to accommodate changes in the taxonomy. In order to apply a rules-based system to monitor the health of the platform, the physics of the platform and its subsystems must be known in order to identify the appropriate rules. However, the dynamics of a platform and its subsystems are sometimes complex and/or unknown, which may make the application of a rules-based system to the health monitoring of the platform a challenge.

BRIEF SUMMARY

An improved monitoring system, method and computer program product for monitoring the health of a monitored system are therefore provided. The monitoring system, method and computer program product of one embodiment consider both sensor data and textural data in determining relationships between the sensor data and the textural data utilizing an associative memory. By considering a more robust data set, including both sensor data and textural data, the monitoring system, method and computer program product of one embodiment may monitor the health of a monitored system in a more reliable and holistic manner.

In one embodiment, a monitoring system for monitoring health of a monitored system is provided that includes a receiver module configured to receive a plurality of sensor data relating to the monitored system and to receive textual data, such as free text, relating to the monitored system. The monitoring system of this embodiment also includes an associative memory configured to store and process the sensor data and the textual data and to establish associations between at least some of the sensor data and the textual data. Further, the monitoring system may include a dynamic change identification module configured to identify an instance in which the sensor data represents a dynamic change in condition and a correlation module configured to identify an instance in which textual data is associated with the sensor data proximate the dynamic change in condition so as to correlate the sensor data and the textual data.

The sensor data and the textual data may be associated with respective times. Thus, the correlation module may be further configured to identify an instance in which the textual data is temporally related to the dynamic change in condition. The associative memory may include a multi-level associative memory that is further configured to overlay the textual data onto the sensor data stored in the associative memory. The monitoring system of one embodiment may also include an analysis module configured to analyze correlations between the sensor data and the textual data for a plurality of components of the monitored system. Additionally or alternatively, the monitoring system may include an analysis module configured to analyze correlations between the sensor data and the textual data for a common component across a plurality of monitored systems. The monitoring system of one embodiment may also include a report generation module configured to cause a report to be generated of correlations between the sensor data and the textual data.

In another embodiment, a method is provided for monitoring health of a monitored system, which includes receiving a plurality of sensor data relating to the monitored system, receiving textual data, such as free text, relating to the monitored system and storing the sensor data and the textual data in an associative memory. In this regard, the storing of the sensor data and the textual data in the associative memory establishes associations between at least some of the sensor data and the textual data. The method of this embodiment also identifies an instance in which the sensor data represents a dynamic change in condition and identifies an instance in which textual data is associated with the sensor data proximate the dynamic change in condition so as to correlate the sensor data and the textual data.

The sensor data and the textual data may be associated with respective times such that identifying an instance in which textual data is associated with the sensor data may include identifying an instance in which the textual data is temporally related to the dynamic change in condition. In one embodiment, storing the sensor data and the textual data in an associative memory may include overlaying the textual data onto the sensor data stored in the associative memory. The method may also analyze correlations between the sensor data and the textual data for a plurality of components of the monitored system and/or may analyze correlations between the sensor data and the textual data for a common component across a plurality of monitored systems. The method of one embodiment may also cause a report to be generated of correlations between the sensor data and the textual data.

In a further embodiment, a computer-readable storage medium for monitoring health of a monitored system is provided that includes computer-readable program code portions stored therein that in response to execution by a processor cause an apparatus to receive a plurality of sensor data relating to the monitored system, receive textual data, such as free text, relating to the monitored system and store the sensor data and the textual data in an associative memory so as to establish associations between at least some of the sensor data and the textual data. In this regard, the textual data may be overlaid onto the sensor data stored in the associative memory. The computer-readable program code portions may also cause the apparatus to identify an instance in which the sensor data represents a dynamic change in condition and to identify an instance in which textual data is associated with the sensor data proximate the dynamic change in condition so as to correlate the sensor data and the textual data.

The sensor data and the textual data may be associated with respective times such that the computer-readable program code portions for causing the apparatus to identify an instance in which textual data is associated with the sensor data may further cause the apparatus to identify an instance in which the textual data is temporally related to the dynamic change in condition. In one embodiment, the computer-readable program code portions, in response to execution by the processor, further cause the apparatus to analyze correlations between the sensor data and the textual data for a plurality of components of the monitored system. Additionally or alternatively, the computer-readable program code portions, in response to execution by the processor, may further cause the apparatus to analyze correlations between the sensor data and the textual data for a common component across a plurality of monitored systems.

In accordance with embodiments of the present disclosure, monitoring systems, methods and computer program products are provided in order to provide for more robust health monitoring of a monitored system by correlating and considering both sensor data and textual data. However, the features, functions and advantages that have been discussed may be achieved independently and the various embodiments of the present disclosure may be combined in other embodiments, further details of which may be seen with reference to the detailed description and drawings.

BRIEF DESCRIPTION OF THE DRAWINGS

Having thus described example embodiments of the present disclosure in general terms, reference will now be made to the accompanying drawings, which are not necessarily drawn to scale, and wherein:

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Example embodiments of the present disclosure provide a monitoring system, method and computer-readable storage medium for monitoring the health of a monitored system by correlating and considering both sensor data and textual data. A wide variety of monitored systems may be monitored in order to assess the health of the platform and, in some instances, subsystems onboard the platform. For example, the monitored system may be a platform, such as a vehicle, a wind turbine, an engines or the like and, as such, the monitoring system, method and computer-readable storage medium are described in the context of the monitoring of the health of a platform for purposes of example, but not of limitation. However, the monitored system may take other forms and may be, for example, a physical system, such as a person, such that the monitoring system, method and computer program product may be equally applicable to domains, such as to health care, other than those described below. Additionally, the health of the monitored system may include various measures of its functional and/or operational status.

As explained below, the monitoring system of example embodiments of the present disclosure may include or otherwise be in communication with a number of modules configured to perform respective operations described herein. Although shown as separate modules, it should be understood that the operations performed by more than one module may be integrated within and instead performed by a single module. It should also be understood that operations performed by one module may be separated and, instead, performed by more than one module.

A module may be embodied as various means for implementing the various functionalities of example embodiments of the present disclosure. A module may optionally include, for example, one or more processors, memory devices, Input/Output (I/O) interfaces, communications interfaces and/or user interfaces. The processor may include, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be specifically configured to operate such that the processor causes the module to perform various functionalities described herein.

Whether configured as hardware alone or via instructions stored on a computer-readable storage medium, or by a combination thereof, the processor may be an apparatus embodying or otherwise configured to perform operations of a module according to embodiments of the present disclosure while accordingly configured. Thus, in example embodiments where the processor is embodied as, or is part of, an ASIC, FPGA, or the like, the module is specifically configured hardware for conducting the operations described herein. Alternatively, in example embodiments where the processor is embodied as an executor of instructions stored on a computer-readable storage medium, the instructions specifically configure the module to perform the algorithms and operations described herein.

The memory device of a module may be one or more non-transitory computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor of the module.

Further, the memory device of a module may be configured to store information, data, applications, computer-readable program code instructions, and/or the like for enabling the module to carry out various functions in accordance with example embodiments of the present disclosure described herein. For example, the memory device may be configured to buffer input data for processing by the processor of the module. Additionally, or alternatively, the memory device may be configured to store instructions for execution by the processor.

The I/O interface of a module may be any device, circuitry, or means embodied in hardware, software or a combination of hardware and software that is configured to interface the processor of the module with other circuitry or devices, such as the communications interface and/or the user interface of the module. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the module to perform, various functionalities of an example embodiment of the present disclosure.

The communication interface of a module may be any device or means embodied in hardware, software or a combination of hardware and software that is configured to receive and/or transmit data from/to one or more networks and/or any other device or module in communication with the respective module. The communications interface may be configured to provide for communications in accordance with any of a number of wired or wireless communication standards. The processor of the module may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. The module of one example may communicate via the communication interface with various other network elements in a device-to-device fashion and/or via indirect communications.

The user interface of a module may be in communication with the processor of the module to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device of the module). In some example embodiments, the user interface circuitry is configured to facilitate user control of at least some functions of the module through the use of a display and configured to respond to user inputs. The processor may also comprise, or be in communication with, display circuitry configured to display at least a portion of a user interface, the display and the display circuitry configured to facilitate user control of at least some functions of the module.

Figure 1:
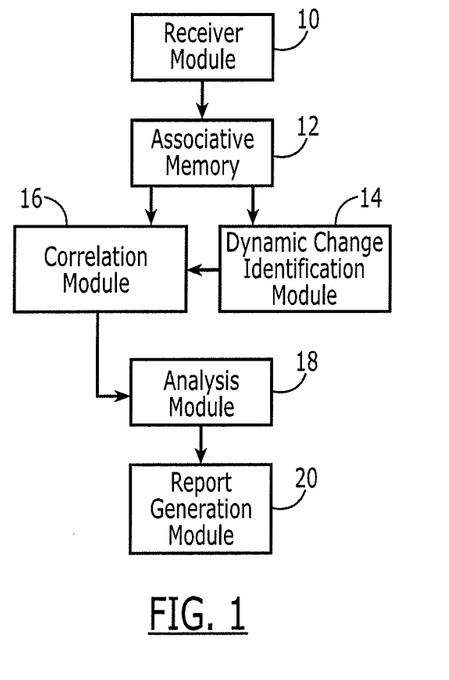
FIG. 1 is a block diagram of a monitoring system configured to monitor the health of a monitored system in accordance with one embodiment of the present disclosure.

As shown in FIG. 1, the monitoring system includes a receiver module 10 which, as described above, may include an I/O interface, a communication interface, a memory and/or a processor that are specifically configured in order to receive data from the platform relating to the health of the platform and/or one or more subsystems onboard the platform. The receiver module 10 may be configured to receive a variety of data from multiple sources that has multiple formats. As shown in operation 30 of FIG. 2, for example, the receiver module 10 may receive sensor data from one or more sensors onboard the platform. The sensor data may be provided by a variety of different sensors, such as vibration sensors, temperature sensors, air flow sensors, electrical current sensors and the like, such that the sensor data likewise represents or characterizes a number of different parameters of the platform and/or the subsystems onboard the platform. The receiver module 10 may also be configured to associate a time value, such as the time of receipt, with the sensor data if the sensor data is not provided with a corresponding time value.

Figure 2:
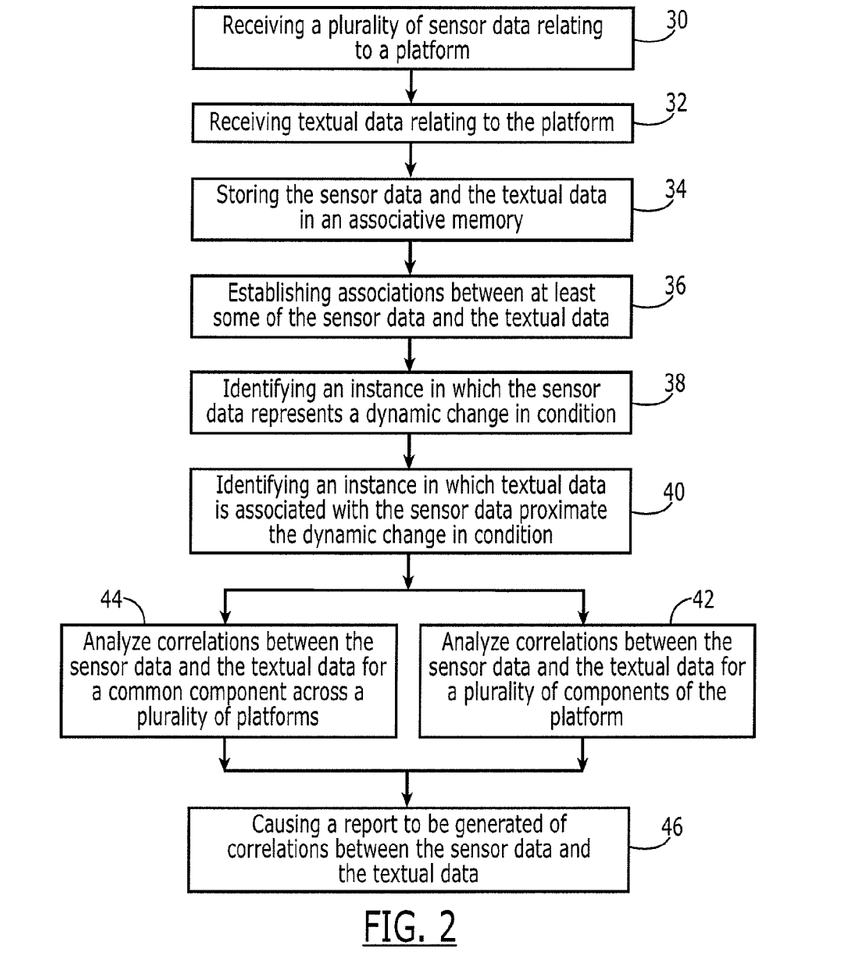
FIG. 2 is a flowchart illustrating operations performed in order to monitor the health of a monitored system in accordance with one embodiment of the present disclosure.

As shown in operation 32 of FIG. 2, the receiver module 10 may also be configured to receive textual data, such as free text, relating to the platform. The textual data may be entered for a variety of different purposes. For example, maintenance engineers may enter textual data describing repairs or other modifications that have been made to the platform. The textual data is generally received by the receiver module 10 along with an indication of the component(s) to which the textual data relates, such as the component(s) that was repaired or otherwise modified, and the time at which the textual data was entered and/or the time at which the repair or modification of the component(s) was made. If the textual data fails to include an associated time value, however, the receiver module 10 may again be configured to associate a time value with the textual data, such as the time at which the textual data was received by the receiver module.

In accordance with one embodiment of the present disclosure, the monitoring system includes an associative memory 12. Associative memory 12 is a data-storage device in which a location is identified by its informational content rather than by names, addresses, or relative positions, and from which the data may be retrieved. In one embodiment, the associative memory 12 is a multi-tier associative memory. The receiver module 10 may be configured to provide the data that has been received regarding the health of the platform to the associative memory 12. In this regard, the receiver module 10 may provide the sensor data to the associative memory 12 along with the associated time information for storage therein. See operation 34 of FIG. 2. The receiver module 10 may also provide the textual data that has been received from the platform indicative of the health of the platform to the associative memory 12 to be overlaid upon the sensor data stored by the associative memory. As a result, the associative memory 12 may associate at least some of the textual data with at least some of the sensor data. See operation 36 of FIG. 2. While the sensor data and the textual data may be associated in various manners, the associative memory 12 of one embodiment may associate the sensor data and the textual data on a temporal basis based upon the time associated with the sensor data and the textual data, as described below. Additionally or alternatively, the associative memory may associate the sensor data and the textual data based upon the component of the platform to which the sensor data or the textual data relates.

The monitoring system may also include a dynamic change identification module 14 which may include, for example, a processor as described above. As shown in operation 38 of FIG. 2, the dynamic change identification module 14 may be configured to identify an instance in which the sensor data represents a dynamic change in condition. A dynamic change in condition may be defined in various manners, but in one embodiment, is defined as a change in the sensor data from one or more sensors by at least a predefined amount, typically in a time period less than a predetermined temporal threshold. For example, the sensor data from a vibration sensor may be above 100 and gradually rising over the course of time, but may dramatically drop to below to 20 with the drop occurring over the span of less than five minutes. In an embodiment in which the threshold amount for a dynamic change in condition is a change, e.g., a reduction, of at least 50 percent over a time period of ten minutes or less, this change in the data from the vibration sensor would be identified by the dynamic change identification module 14 as a dynamic change in condition.

The monitoring system may also include a correlation module 16 comprising a processor specifically configured to identify an instance in which textual data is associated with the sensor data proximate the dynamic change in condition. See operation 40 of FIG. 2. For example, the correlation module 16 may associate textual data with the sensor data that has experienced the dynamic change in condition as a result of the sensor data and the textual data both relating to the same component of the platform. However, the correlation module 16 may require the satisfaction of additional relationship(s) between the sensor data and the textual data in order the associate the sensor data and the textual data in other embodiments. In this regard, the correlation module 16 may be configured to require the textual data to be temporally proximate to the time at which the sensor data experienced the dynamic change in condition in order to associate the textual data with the sensor data that has experienced the dynamic change in condition. For example, the correlation module 16 may be configured to require the textual data to have a time value that is within a predefined period of time from the time at which the sensor data experienced the dynamic change in condition in order to associate the textual data with the sensor data that has experienced the dynamic change in condition. By requiring temporal proximity between the textual data and the dynamic change in condition represented by the sensor data, the correlation module 16 may correlate the textual data and the dynamic changes in condition represented by the sensor data that relate to the same event, such as an instance in which the textual data relates to and may provide an explanation of an activity that may have caused the dynamic change in condition of the sensor data. For example, the textual data may be entered by a maintenance engineer who may record activities associated with the repair, replacement or other modification of a component of the platform. The repair, replacement or other modification of the component may, in turn, have caused or at least contributed to the dynamic change in condition as reflected by the sensor data since the sensor data accumulated prior to the maintenance activities may have been reflective of an improperly functioning component while the sensor data accumulated after the maintenance activities may now be reflective of the proper functioning of the component. As such, the correlation of textual data to dynamic changes in condition represented by the sensor data may serve to explain the dynamic change in condition and may also serve to provide feedback as to whether an activity, such as a maintenance activity, that is the subject of the textual data had the intended effect upon the component and, in turn, upon the platform. By correlating the textual data and the sensor data, the monitoring system of one embodiment may also provide for interdisciplinary correlation due to the different origins of the textual data and the sensor data.

The monitoring system of one embodiment may also include an analysis module 18 which may, in turn, be comprised by a specifically configured processor. In one embodiment, the analysis module 18 may be configured to analyze the correlations between the sensor data and the textual data for one or more components of the platform. See operation 42 of FIG. 2. Based on such an analysis, interrelatedness between the operations of the various components may be identified. For example, the repair of a first component as described by the textual data associated with the component and a dynamic change in condition as reflected by the sensor data related to the first component may be coincident with a dynamic change in condition of one or more other components on the platform. In this instance, it may be hypothesized that the repair to the first component may have improved the performance of the first component, but may have led to the degradation of the performance of the other components. As such, further testing may be conducted, if desired, to determine the interrelatedness of the components and their respective performance.

Additionally or alternatively, the analysis module 18 may be configured to analyze correlations between the sensor data and the textual data for a common component across a plurality of platforms. See operation 44 of FIG. 2. In this regard, the analysis module 18 may be configured to determine if the same component consistently responds in the same or a comparable manner to a particular maintenance activity as represented, for example, by a dynamic change in condition as reflected by the sensor data of the component on each of the plurality of platforms. By analyzing the same component on a plurality of platforms, a hypothesis may be developed as the behavior of the particular component and its response to maintenance activities that has more reliability and credibility since the hypothesis is not simply based upon the behavior of a single component and its response to a maintenance activity, but the behaviors of a plurality of the same component across plurality of platforms and their response the same type of maintenance activity.

In one embodiment, the monitoring system may also include a report generation module 20 configured to cause a report to be generated of correlations between the sensor data and the textual data. See operation 46 of FIG. 2. The report generation module 20 may be comprised of a processor, an I/O interface, a communication interface, a user interface or the like. The report generation module 20 may generate various types of reports depending upon the interests of the user, the type of platforms, or the like. Several reports, such as graphs, are illustrated in FIGS. 3-6 and are described below for purposes of example, but not of limitation.

Figure 3:
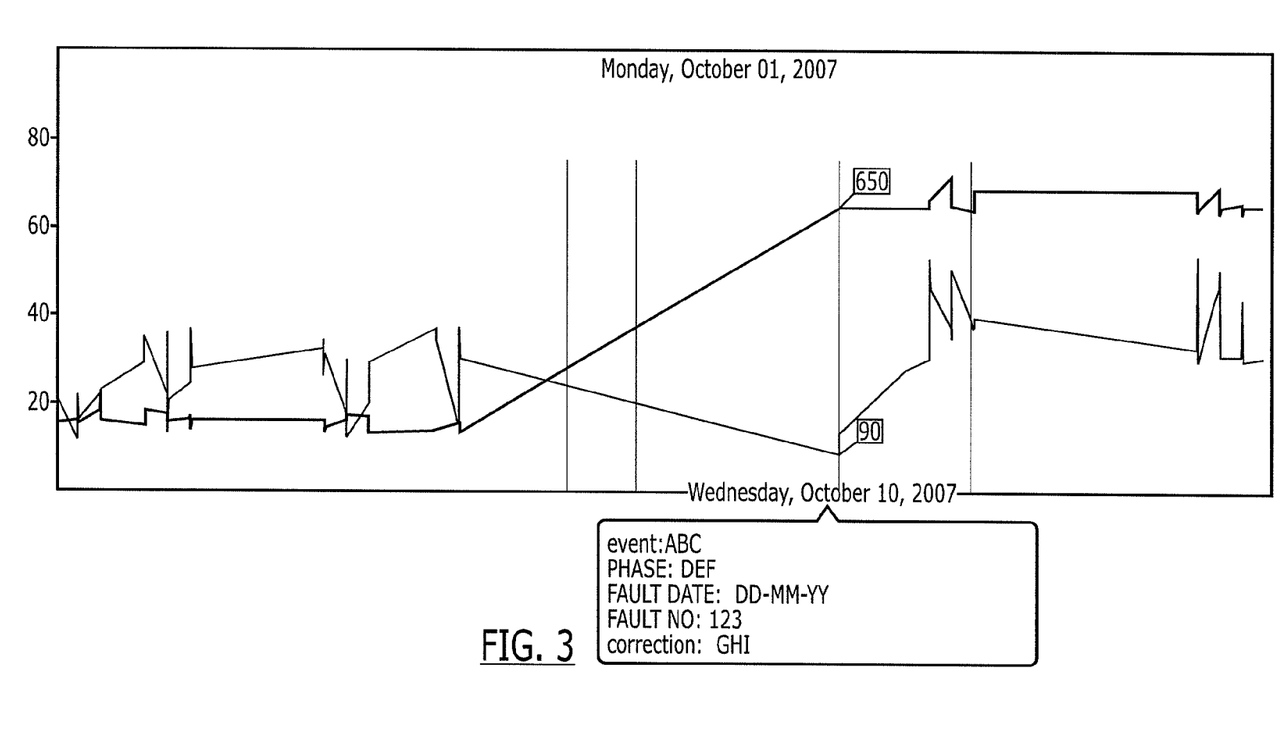
FIG. 3 is a graphical representation of sensor data and textural data correlated in accordance with one embodiment of the present disclosure.

In regards to FIG. 3, for example, a graphical representation of vibration sensor data for a sync shaft of a rotor craft is illustrated. In this regard, the squiggly lines that extend from the left to the right across the graph represent the sensor data over time for the third and ninth sensors o the sync shaft, as numerically designated by the legends of 90 and 650. In addition to the sensor data, vertical lines represent the time at which components were removed and replaced. In other embodiments, vertical lines may also be added to represent the time at which components undergo maintenance. Additionally, textual data is associated with the sensor data, such as by the associative memory 12. By way of example, the textual data of FIG. 3 indicates that a self tuning dynamic vibration absorber damper was removed and replaced. By associating the textual data with the sensor data, the sensor data proximate the textual data may be reviewed in order to determine the manner in which the sensor data changed in response to the maintenance activity and, in turn, to determine the effectiveness of the maintenance activity.

Figure 4:
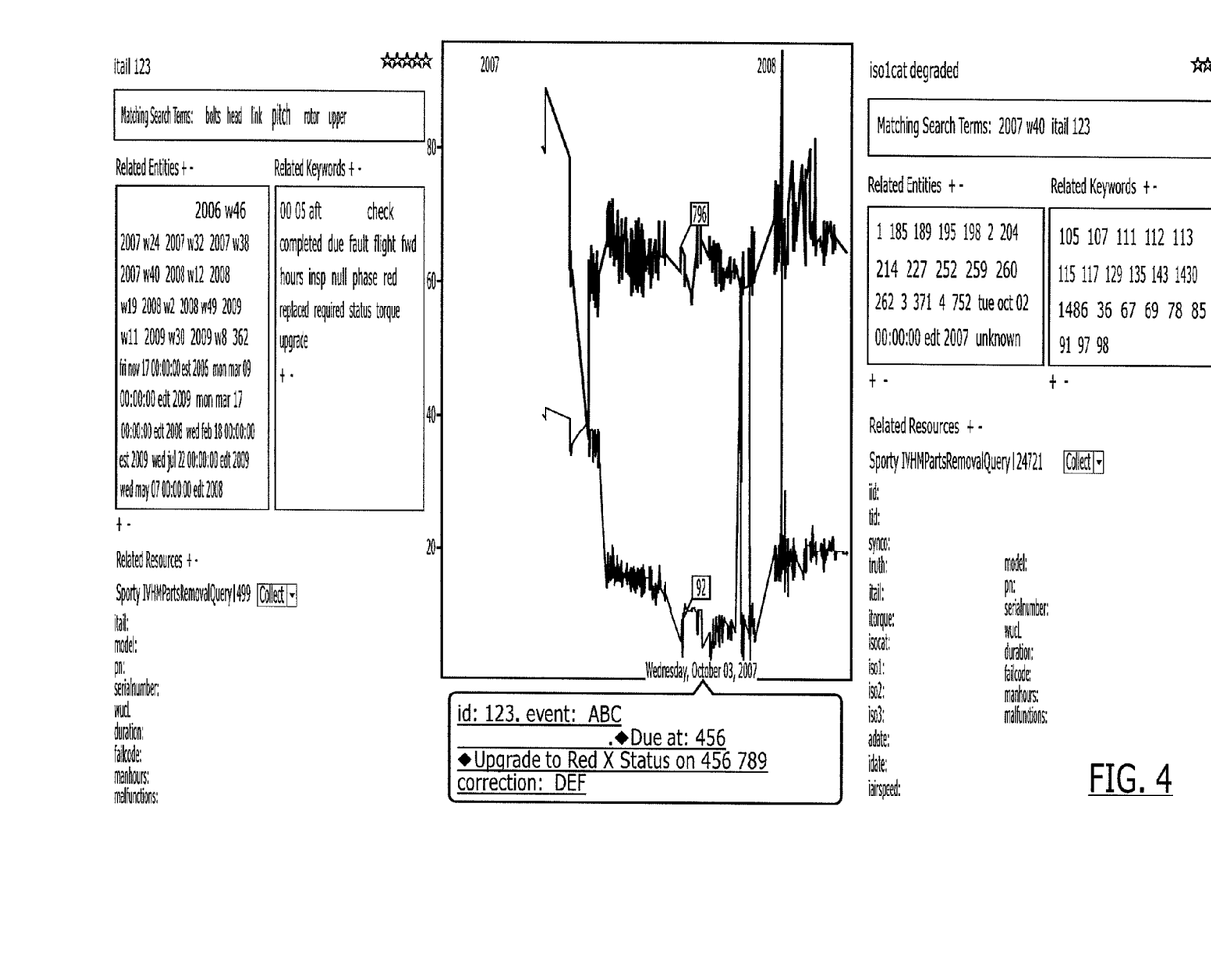
FIG. 4 is a graphical representation of sensor data and correlated textural data along with related entities and related key words as identified by the associative memory in accordance with one embodiment of the present disclosure.

Referring now to FIG. 4, a comparable graphical representation of the sensor data provided by two vibration sensors mounted on a sync shaft of a rotor craft is provided. As before, the vibration sensors are numerically designated by legends of 92 and 796. Additionally, textual data is associated with the sensor data as represented by the note regarding the torque check for the forward pitch link bolts. In order to illustrate at least some of the associations that may be drawn by the associative memory 12, FIG. 4 also depicts related entities, related key words and search terms in order to facilitate further searching or study by a user. In this regard, a user may have conducted a search of the associative memory 12 based upon the search terms identified in the upper left portion of FIG. 4 including bolts, head, link, pitch, rotor and upper. Based upon the search, the sensor data for part 123 may be displayed. As a result of the associations established by the associative memory 12, a number of other entities may be identified to be related or associated with the component for which sensor data is being displayed. As shown, the related entities may include dates, sync shaft numbers, sensor values, part numbers and/or tail numbers that are associated with the sensor data for the part, e.g., part 123, that is being displayed as well as parameters, e.g., data, identification information or the like, defining the sensor data or the part. In the illustrated example, the related entities include related parts and related dates 2006 w46, e.g., the $46^{th}$ week of 2006 , 2007 w24, fri nov 17 00:00:00 est 2006, etc. Further details regarding a related entity may be provided on the right hand side of the graph in which information regarding the degraded state of a sync shaft in 2007 w40 (a related date) is correlated with the part that is the subject of the display. Such correlations may evidence the relatedness that maintenance, repair or replacement activities on one component may have on other components. For example, the foregoing correlation depicted in FIG. 4 based upon the date 2007 w40 shows that the replacement of part 123 results in the degradation in the performance of the sync shafts in the back end of the vehicle. Additionally, the associative memory 12 may identify a plurality of keywords that have been associated with the related entities and provide an abbreviated explanation of the manner in which the related entities are related to the sensor data for the part that is displayed. The associative memory 12 may also identify one or more related resources that provide the original context from which the related entities and keywords are extracted. Utilizing the related resources, a user could return to the original data sources and validate with subject matter experts that the results are accurate.

Figure 5:
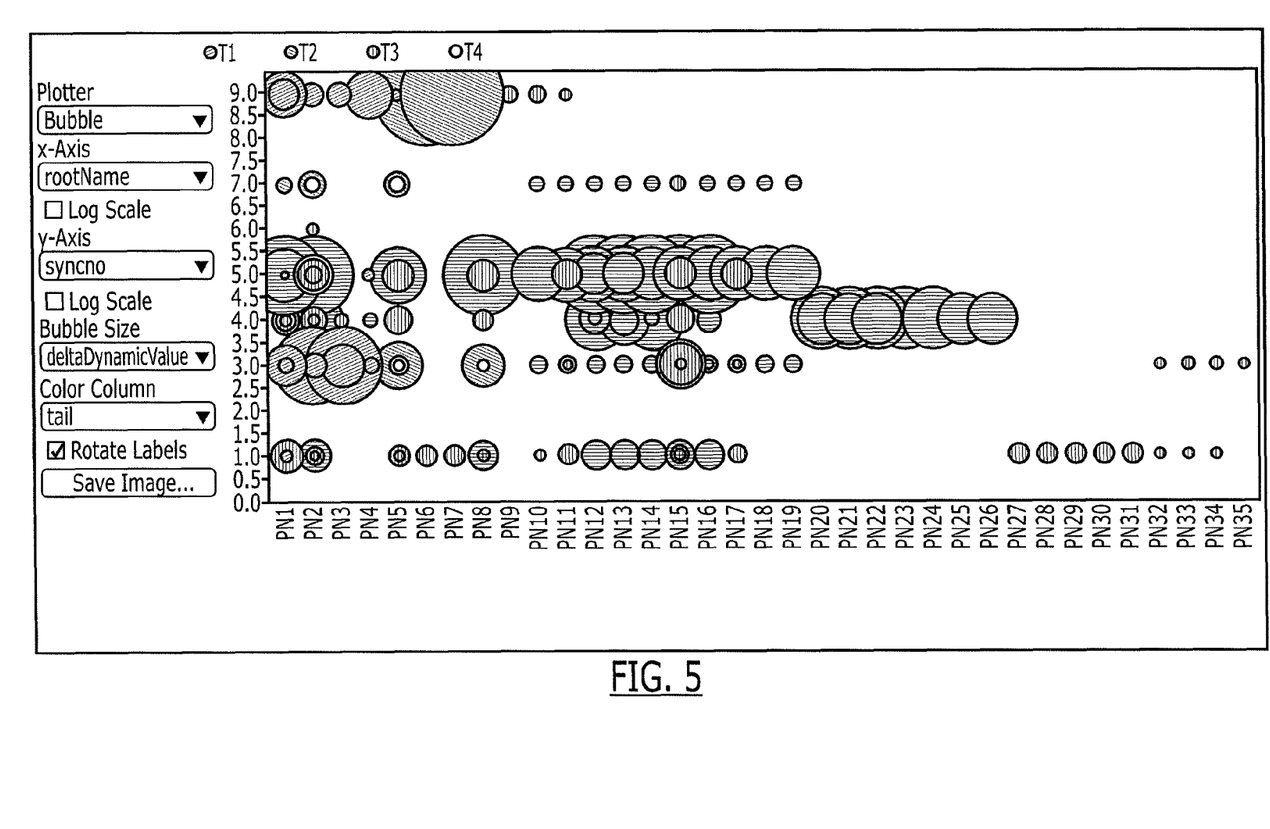
FIG. 5 is a graphical representation of dynamic changes in condition that have been detected from the sensor data for each of a plurality of components for each of a number of sync shafts onboard each of four different platforms as determined by an embodiment of the present disclosure.

Further, FIG. 5 is a graphical representation of dynamic changes in condition that have been detected from the sensor data for each of a plurality of components for each of a number of sync shafts onboard each of four different platforms. In this regard, the components listed by part number along the horizontal axis are components of a sync shaft. Additionally, a platform such as a rotor craft may include a plurality of sync shafts as identified along the vertical axis as 1.0, 2.0, 3.0, etc. Additionally, the different platforms, e.g., rotorcraft, are identified by different colors. For each component of each sync shaft of each platform, a circle is presented in an instance in which a dynamic change in condition was detected with larger circles representing larger dynamic changes in condition. Thus, the size of the circle is proportional to the dynamic change in condition for a respective component of a respective sync shaft of a respective platform.

Figure 6:
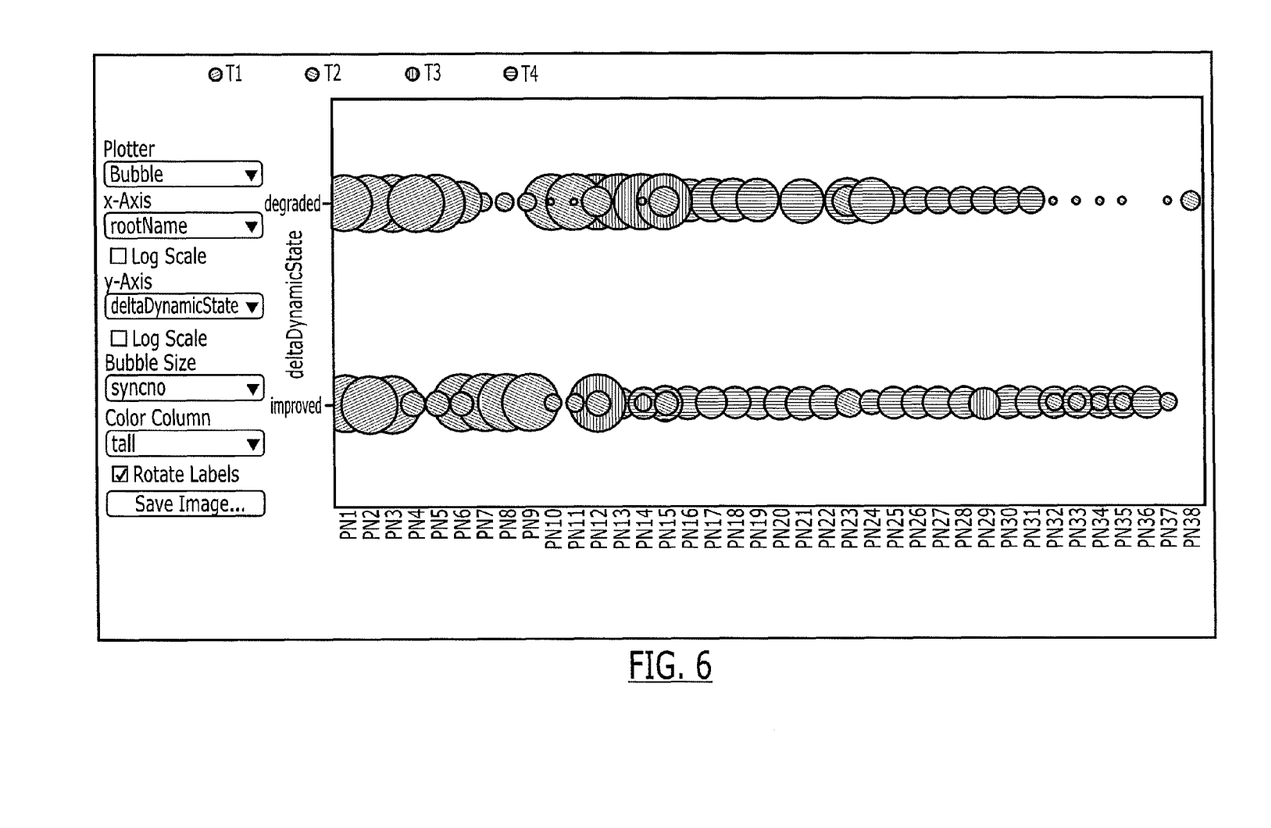
FIG. 6 is a graphical representation of dynamic changes in conditions for a plurality of components of a plurality of platforms indicating whether the dynamic change in condition represents an improvement or degradation as determined by the monitoring of the health of the platforms in accordance with one embodiment of the present disclosure.

Additionally, FIG. 6 illustrates a graphical representation of a number of different components that have been aggregated for each of the sync shafts onboard four different platforms, e.g., rotorcraft, with an indication as to the number of those components which had dynamic changes in condition which improved their performance and which degraded their performance. In this regard, the size of the circle associated with a respective component is reflective of, such as by being proportional to, the number of components that had improved or degraded performances. As with FIG. 5, the color of the circles indicate the particular platform that carries the respective component.

Based on a review of the reports, such as the graphical representations of FIGS. 3-6, the performance of a plurality of different components may be quickly assessed and the effect of various maintenance activities may be determined in an objective manner based upon the associations between the textual data and the sensor data and, in particular, the associations of the textual data proximate to a dynamic change in condition as reflected by the sensor data. Thus, the monitoring system, method and computer program product of the present disclosure may provide for more robust health monitoring, be it for diagnostic, prognostic or other purposes.

FIGS. 1 and 2 illustrate block diagrams of example systems, methods and/or computer program products according to example embodiments. It will be understood that each module or block of the block diagrams, and/or combinations of modules or blocks in the block diagrams, can be implemented by various means. Means for implementing the modules or blocks of the block diagrams, combinations of the modules or blocks in the block diagrams, or other functionality of example embodiments described herein may include hardware, and/or a computer program product including a non-transitory computer-readable storage medium (as opposed to a computer-readable transmission medium which describes a propagating signal) having one or more computer program code instructions, program instructions or executable computer-readable program code instructions stored therein. In this regard, program code instructions for carrying out the operations and functions of the modules of FIG. 1 and the blocks of FIG. 2 and otherwise described herein may be stored in the memory device of an example apparatus, and executed by a processor. As will be appreciated, any such program code instructions may be loaded onto a computer or other programmable apparatus (e.g., processor, memory device or the like) from a computer-readable storage medium to produce a particular machine, such that the particular machine becomes a means for implementing the functions specified in the block diagrams' modules and blocks.

These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the block diagrams' modules or blocks. The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded and/or executed together. Execution of the program code instructions may produce a computer-implemented process such that the instructions executed by the computer, processor or other programmable apparatus provide operations for implementing the functions specified in the block diagrams' modules or blocks.

Accordingly, execution of instructions associated with the operations of the modules or blocks of the block diagrams by a processor, or storage of instructions associated with the modules or blocks of the block diagrams in a computer-readable storage medium, supports combinations of operations for performing the specified functions. It will also be understood that one or more modules or blocks of the block diagrams, and combinations of modules or blocks in the block diagrams, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A monitoring system for monitoring health of a monitored system, the monitoring system comprising:
   a receiver module configured to receive a plurality of sensor data relating to the monitored system and to receive textual data relating to the monitored system;
   an associative memory configured to store the sensor data, the textual data and associated time values and to establish associations between at least some of the sensor data and the textual data;
   a dynamic change identification module configured to identify an instance in which the sensor data changes by at least a predefined amount within a time period less than a predefined temporal threshold so as to represent a dynamic change in condition; and
   a correlation module configured to identify an instance in which textual data is associated with the sensor data proximate the dynamic change in condition so as to correlate the sensor data and the textual data, wherein the correlation module is configured to correlate the sensor data and the textual data by identifying an instance in which the time value associated with the textual data is within a predefined period of time from a time at which the sensor data experienced the dynamic change in condition.

2. A monitoring system according to claim 1 wherein the associative memory comprises a multi-level associative memory that is further configured to overlay the textual data onto the sensor data stored in the associative memory.

3. A monitoring system according to claim 1 wherein the receiver module is further configured to receive free text.

4. A monitoring system according to claim 1 further comprising an analysis module configured to analyze correlations between the sensor data and the textual data for a plurality of components of the monitored system.

5. A monitoring system according to claim 1 further comprising an analysis module configured to analyze correlations between the sensor data and the textual data for a common component across a plurality of monitored systems.

6. A monitoring system according to claim 1 further comprising a report generation module configured to cause a report to be generated of correlations between the sensor data and the textual data.

7. A method for monitoring health of a monitored system, the method comprising:
   receiving a plurality of sensor data relating to the monitored system;
   receiving textual data relating to the monitored system;
   storing the sensor data and the textual data in an associative memory, wherein storing in the associative memory comprises establishing associations between at least some of the sensor data, the textual data and associated time values;
   identifying, with a processor, an instance in which the sensor data changes by at least a predefined amount within a time period less than a predefined temporal threshold so as to represent a dynamic change in condition; and
   identifying, with the processor, an instance in which textual data is associated with the sensor data proximate the dynamic change in condition so as to correlate the sensor data and the textual data by identifying an instance in which the time value associated with the textual data is within a predefined period of time from a time at which the sensor data experienced the dynamic change in condition.

8. A method according to claim 7 wherein storing the sensor data and the textual data in an associative memory comprises overlaying the textual data onto the sensor data stored in the associative memory.

9. A method according to claim 7 wherein receiving textual data comprises receiving free text.

10. A method according to claim 7 further comprising analyzing correlations between the sensor data and the textual data for a plurality of components of the monitored system.

11. A method according to claim 7 further comprising analyzing correlations between the sensor data and the textual data for a common component across a plurality of monitored systems.

12. A method according to claim 7 further comprising causing a report to be generated of correlations between the sensor data and the textual data.

13. A non-transitory computer-readable storage medium for monitoring health of a monitored system, the computer-readable storage medium having computer-readable program code portions stored therein that in response to execution by a processor cause an apparatus to:
   receive a plurality of sensor data relating to the monitored system;
   receive textual data relating to the monitored system;
   store the sensor data and the textual data in an associative memory so as to establish associations between at least some of the sensor data, the textual data and associated time values;
   identify an instance in which the sensor data changes by at least a predefined amount within a time period less than a predefined temporal threshold so as to represent a dynamic change in condition; and
   identify an instance in which textual data is associated with the sensor data proximate the dynamic change in condition so as to correlate the sensor data and the textual data by identifying an instance in which the time value associated with the textual data is within a predefined period of time from a time at which the sensor data experienced the dynamic change in condition.

14. A computer-readable storage medium according to claim 13 wherein the apparatus being caused to store the sensor data and the textual data in an associative memory further includes being caused to overlay the textual data onto the sensor data stored in the associative memory.

15. A computer-readable storage medium according to claim 13 wherein the apparatus being caused to receive textual data further includes being caused to receive free text.

16. A computer-readable storage medium according to claim 13 wherein the computer-readable program code portions, in response to execution by the processor, further cause the apparatus to analyze correlations between the sensor data and the textual data for a plurality of components of the monitored system.

17. A computer-readable storage medium according to claim 13 wherein the computer-readable program code portions, in response to execution by the processor, further cause the apparatus to analyze correlations between the sensor data and the textual data for a common component across a plurality of monitored systems.

* * * * *